United States Patent [19]
Di Giacomo

[11] 3,921,451
[45] Nov. 25, 1975

[54] APPARATUS FOR ELECTRICAL INSPECTION OF INACCESSIBLE ELEMENTS

[75] Inventor: Sebastian F. Di Giacomo, Merrick, N.Y.

[73] Assignee: Gull Airborne Instruments, Inc., New York, N.Y.

[22] Filed: Jan. 2, 1974

[21] Appl. No.: 429,554

Related U.S. Application Data

[62] Division of Ser. No. 237,718, March 24, 1972, Pat. No. 3,798,515.

[52] U.S. Cl. ............... 73/304 C; 73/313; 324/61 P; 339/108 TP
[51] Int. Cl.² ................. G01F 23/26; G01R 31/04
[58] Field of Search......... 73/304 C, 313; 324/60 C, 324/61 B, 149, 51, 61 P; 339/103 R, 103 C, 108 TP; 340/200

[56] References Cited
UNITED STATES PATENTS

| | | | |
|---|---|---|---|
| 2,623,099 | 12/1952 | Wallace et al. | 324/51 |
| 2,694,930 | 11/1954 | Lamb et al. | 73/313 X |
| 2,752,563 | 6/1956 | Bowden | 324/51 X |
| 3,156,864 | 11/1964 | Shaw | 324/51 X |
| 3,167,959 | 2/1965 | Johnson | 73/304 C |
| 3,349,301 | 10/1967 | Bell | 73/304 C X |
| 3,638,491 | 2/1972 | Hart | 73/304 C |
| 3,670,094 | 6/1972 | Mattson | 339/103 R X |
| 3,786,395 | 1/1974 | DeLuca | 339/103 C X |

Primary Examiner—Richard C. Queisser
Assistant Examiner—Daniel M. Yasich
Attorney, Agent, or Firm—Cooper, Dunham, Clark, Griffin & Moran

[57] ABSTRACT

Apparatus is provided for electrically inspecting capacitance elements located in a fuel tank without removing them from their operating positions. This apparatus includes a fault isolation probe having terminals connected by slack conductors to the capacitance elements. The fault isolation probe is mounted in the tank, and is removable from the tank without interrupting the circuit connections to the capacitors, so that after withdrawing the fault isolation probe from the tank, electrical tests of the capacitors may be made through the slack conductors, while leaving the capacitors in their operating positions. Fuel level measuring capacitors are provided, as well as capacitors for compensating for changes in the dielectric constant of the fuel.

6 Claims, 8 Drawing Figures

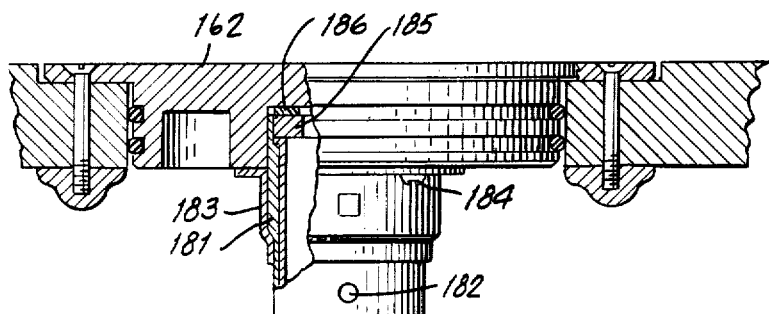
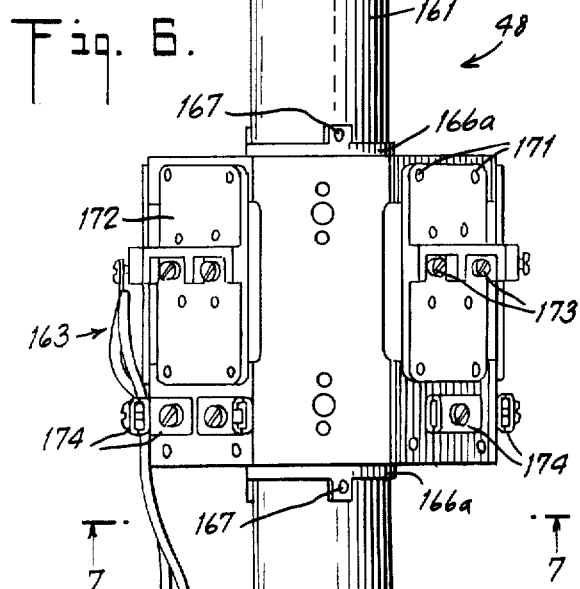
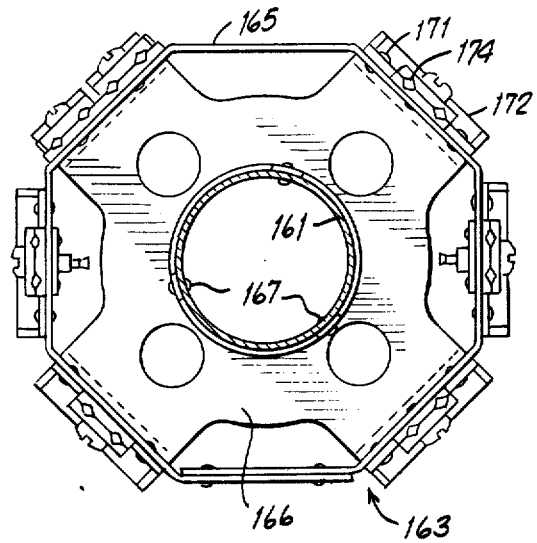
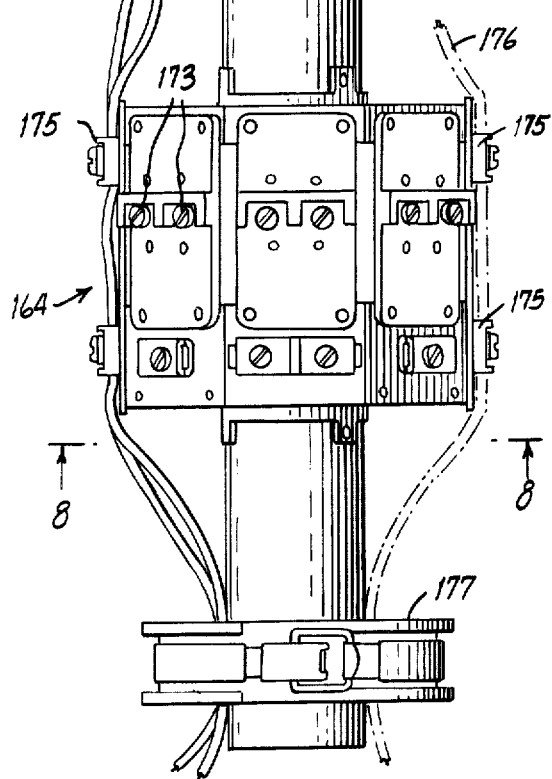
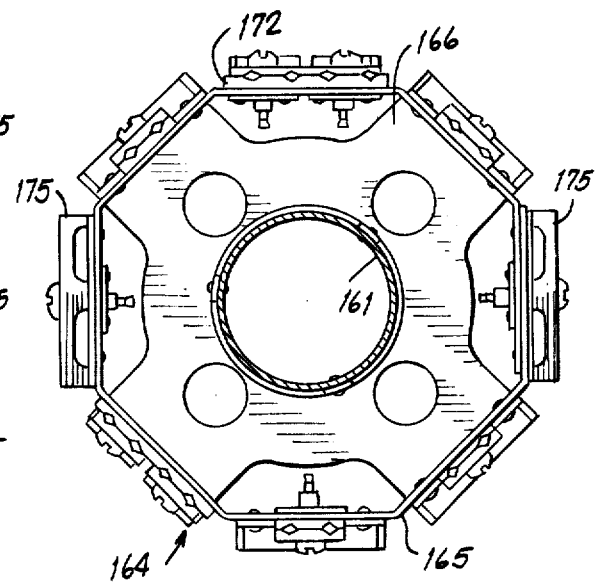

APPARATUS FOR ELECTRICAL INSPECTION OF INACCESSIBLE ELEMENTS

CROSS-REFERENCE

This application is a division of my application Ser. No. 237,718, filed Mar. 24, 1972, entitled "Fuel Immersible Capacitor for Measurement of Liquid Fuel in a Tank", now U.S. Pat. No. 3,798,515, issued Mar. 19, 1974.

The apparatus described in this application is intended for use with the digital indicating and control system shown and described in the copending application of Walter Hersch and Ira A. Rubel, Ser. No. 275,765, filed July 27, 1972, now U.S. Pat. No. 3,830,090, issued Aug. 20, 1974. The present invention has substantial utility, however, in connection with other indicating and control systems.

BRIEF SUMMARY OF THE INVENTION

Fuel mass measuring apparatus includes, in each tank in which the fuel is to be measured, at least one level measuring capacitor, one compensating capacitor, and a fault isolation probe. These capacitors and the probe are capable of functioning either when immersed in fuel or when not so immersed. The terminals of each capacitor in a tank are connected to terminals on a fault isolation probe of that tank through slack conductors. Sufficient slack is allowed in the conductors so that the isolation probe with its terminals may be withdrawn from the tank without disconnecting the conductors, thereby giving access at the terminals to electrical connections to each capacitor individually. The separate capacitors may be tested by the use of those connections.

Each fault isolation probe includes an elongated support tube and a pair of spaced terminal assemblies attached thereto. The low voltage terminals of the capacitors are mounted on the assembly nearest the upper end of the support tube. The high voltage terminals and a set of strain relief clamps are mounted on the other assembly. The slack wires leading to the low voltage terminals pass under the strain relief clamps on the high voltage terminal assembly. The outer end of the support tube is mounted in an outer wall of the tank by means of a flanged plate and sealing means. The flanged plate is held in place on the wall of the tank by means of flush head screws.

Other slack wire connections extend from the fault isolation probe to a connector in a bulkhead wall of the tank. From the other side of the connector, conductors extend to an electrical measuring system including a potential supply means, a balanceable circuit, an indicator, and means responsive to a potential in the circuit for rebalancing the circuit and driving the indicator.

DRAWINGS

FIG. 6 is an elevational view of a fault isolation probe constructed in accordance with the invention.

FIG. 7 is a sectional view on the line 7—7 of FIG. 6.

FIG. 8 is a sectional view on the line 8—8 of FIG. 6.

DETAILED DESCRIPTION

FIG. 1

Figure 1:
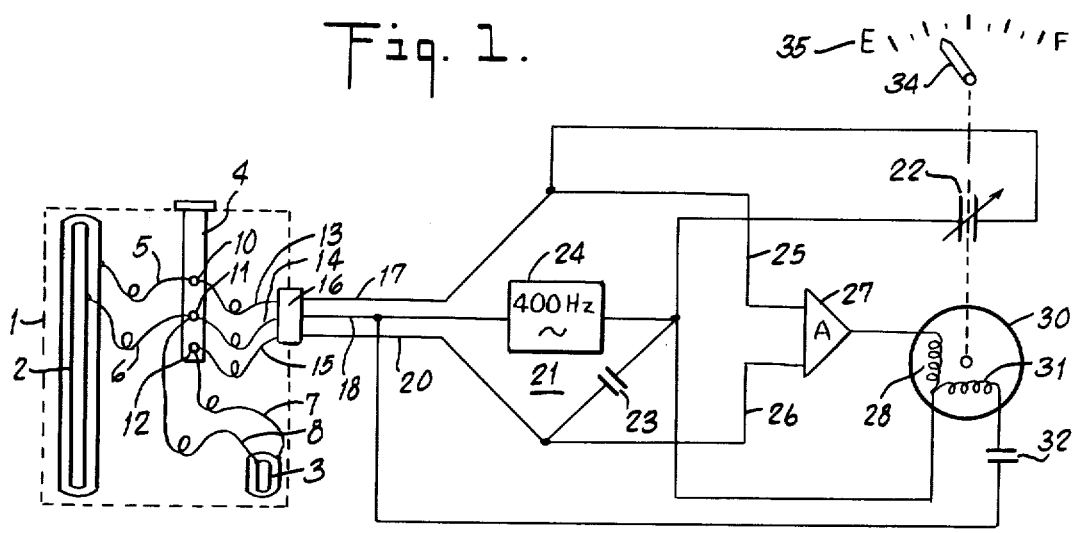
FIG. 1 is a diagrammatic illustration of one form of fuel measuring system including fuel immersible elements and embodying the present invention.

This figure illustrates diagrammatically a fuel mass measuring system in which the fuel immersed portions embody certain features of the invention. Other parts of the system are highly simplified. The system shown includes a fuel tank 1 in which are located a fuel level measuring capacitor 2, a compensating capacitor 3 and a fault isolation probe 4. The terminals of the capacitor 2 are connected by means of slack conductors 5 and 6 to terminals 10 and 11 on the fault isolation probe 4. The terminals on the capacitor 3 are connected through slack conductors 7 and 8 to terminals 11 and 12 on the fault isolation probe 4. The three terminals 10, 11 and 12 on the fault isolation probe 4 are connected respectively through slack conductors 13, 14 and 15 to an electrical connector 16 fixed in a wall of the tank 1. The conductors 13, 14 and 15 are connected through that connector 16 to conductors 17, 18 and 20 which form part of a capacitance bridge circuit generally indicated at 21.

The level measuring capacitor 2 is connected in one arm of the bridge and the compensating capacitor 3 in an adjacent arm. Two capacitors 22 and 23 are connected in the other two arms of the bridge. A power supply 24, shown as 400 hertz, which is the conventional frequency of aircraft power supplies, is connected across the input terminals of the bridge 21. The output terminals are connected through conductors 25 and 26 to the input terminals of an amplifier 27 whose output is connected to one winding 28 of a two-phase motor 30. The other winding 31 of the motor 30 is connected in series with a capacitor 32 across the terminals of the power supply 24.

Capacitor 22 is a variable capacitor controlled by the motor 30. A pointer 34 also driven by the motor 30 cooperates with a scale 35 which indicates the quantity of fuel in the tank.

When it is desired to check the capacitors 2 and 3, it can be done simply by withdrawing the probe 4 from the tank, which is permitted by the slack wire connections. Electrical access to the capacitors 2 and 3 individually can be obtained at the terminals 10, 11 and 12, when the fault isolation probe is withdrawn from the tank. In this way, the integrity of the capacitors 2 and 3 may be checked without disturbing their location. Note that capacitor 2 is so located in the tank that it is accessible only with great difficulty, as may be seen in the case of the level measuring capacitor 47 in FIG. 4. If the system is not functioning properly, it can thus be readily determined whether the fault lies in one of the capacitors 2 and 3 or in some other part of the system.

FIGS. 2-5

Figure 2:
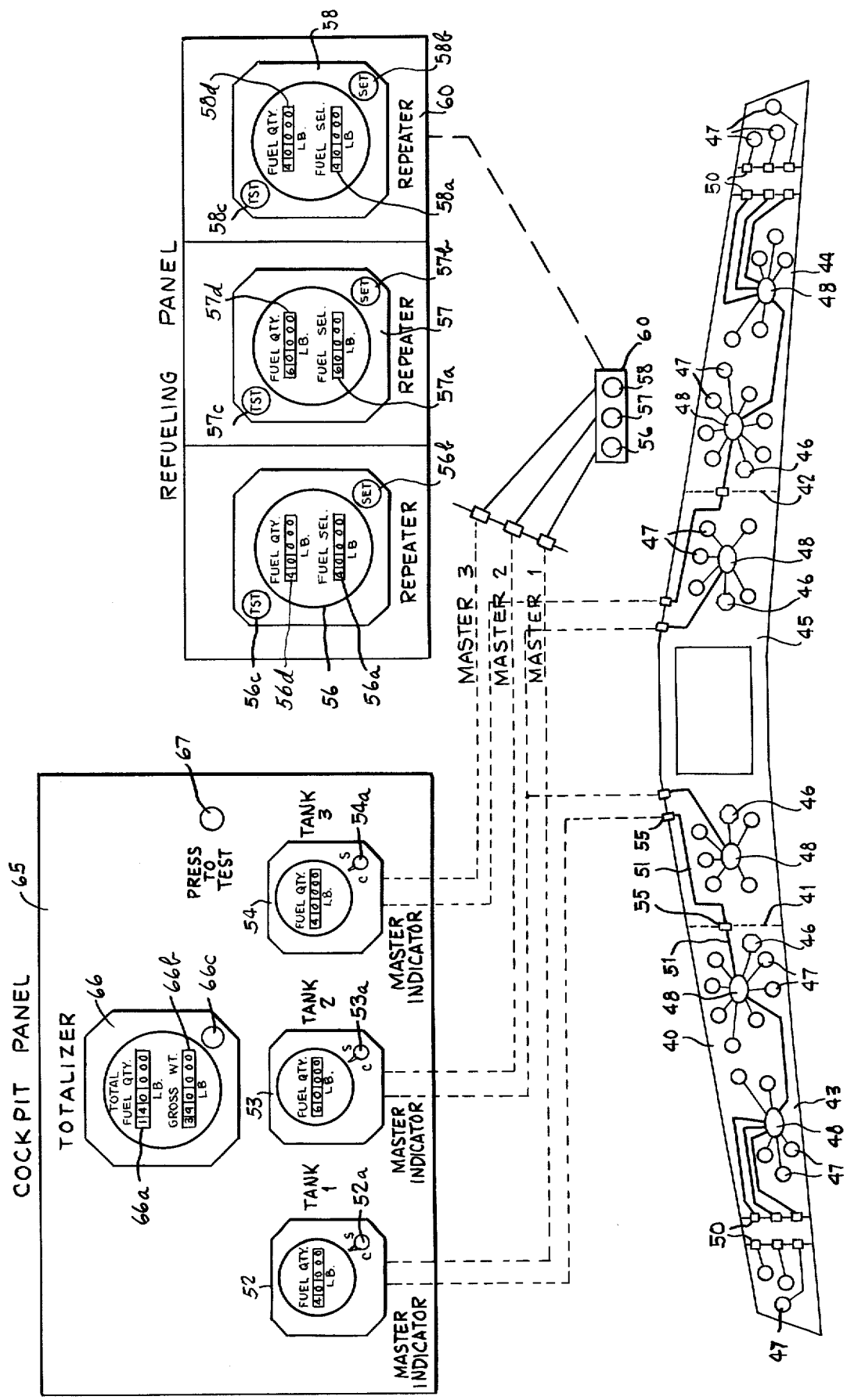
FIG. 2 is a schematic illustration of another more complex form of fuel measuring system in which the present invention is employed.

These figures illustrate a more complex fuel supply system for an aircraft. There is shown in FIG. 2 an aircraft wing 40 separated by bulkheads 41 and 42 into end tanks 43 and 44 and a center tank 45. In each of the end tanks 43 and 44, there is provided one compensating capacitor shown at 46 and indicated by an octagon. The center tank 45 has two compensating capacitors 46. Each tank has a plurality of level measuring capacitors 47, shown by circles in the drawing. EAch capacitor is connected to a fault isolation probe 48, illustrated by an ellipse in the drawing. Each probe 48 serves as a junction point for the connection of several capacitors 47, as illustrated in FIG. 2. In some cases he capacitors are connected to their fault isolation probes through bulkhead connectors, as shown at 50 in the case of the level measuring capacitors 47 in the wing tip portions of the end tanks.

Each fault isolation probe 48 is connected by means of a power supply cable 51 to one of a plurality of master digital indicators 52, 53 and 54. The power supply cables 51 pass through bulkhead connectors where required, as shown diagrammatically at 55. The master indicator 52 displays the fuel quantity in the left end tank 43. The master indicator 53 displays the fuel quantity in the center tank 45. The master indicator 54 displays the fuel quantity in the right end tank 44.

Each of the master indicators is provided with a test switch 52a, 53a, 54a, which is a three-position switch movable from a normal center position either to a left-hand position marked C, or a right-hand position marked S. The master indicators 52, 53 and 54 re located in a cockpit panel 65, which is also provided with a "Press-to-Test" switch 67. When checking the indicator, the press-to-test switch is first used. This switch should cause all three master indicators to read 99900. If that test secures the correct reading on all three indicators, then the capacitors associated with the respective indicators may be tested by using one of the three-position switches 52a, 53a, 54a. This switch is first moved to its S position. In that position capacitors of fixed value are substituted for capacitors 46 and 47 in the fuel measuring circuit, so that the master indicator should read at a particular value, e.g., 10500. If that test turns out correctly, then the switch 52a is turned to the C position, in which a fixed capacitor is substituted for the measuring capacitors 47, but the compensating capacitor 46 is left in the circuit. Under these circumstances, the master indicator should read, for example, 13900 if the tank is completely dry and 10,500 is the compensating capacitor is covered with fuel.

EAch of the three master indicators 52, 53 and 54 controls one of three repeater digital indicators 56, 57 and 58, one for each of the fuel tanks. The repeater indicators are located in a refueling panel 60 at a convenient location on a wing of the aircraft where they are visible to the person in charge of filling the fuel tanks. Each of the repeater indicators is provided with a fuel selector indicator, shown respectively at 56a, 57a and 58a. The fuel selector indicators are settable manually by set knobs 56b, 57b, 58b. Each repeater indicator is also provided with a test button 56c, 57c, 58c.

Each repeater indicator also includes a digital fuel quantity indicator 56d, 57d, 58d. These indicators repeat the indication of the master indicators. Each repeater indicator controls a fuel valve 59 for its associated tank, and closes that valve whenever the fuel quantity indicator reading is equal to or greater than the fuel selector indicator reading. When the fuel quantity indicator reads less than the fuel selector indicator, then the fuel valve 59 may be opened.

The refueling panel 60 also includes a press-to-test switch 68. When that switch is actuated, the fuel quantity indicators 56d, 57d, 58d on the refueling panel should all read 99900.

The master indicators 52, 53 and 54 control a totalizer 66, located in the cockpit panel 65, and having a fuel quantity indicator 66a, which indicates the total weight of fuel in all three of the tanks. The indicator 66 is also provided with a gross weight indicator 66b which is settable by means of a knob 66c to a value equal to the weight of the aircraft plus its load when its fuel tanks are empty. After this indicator is manually set, the system can be started and will supply to the indicator 66b additional fuel weight data which is summed with the previous figure of the weight of the aircraft without fuel to give a figure for the gross weight of the aircraft with fuel.

Figure 3:
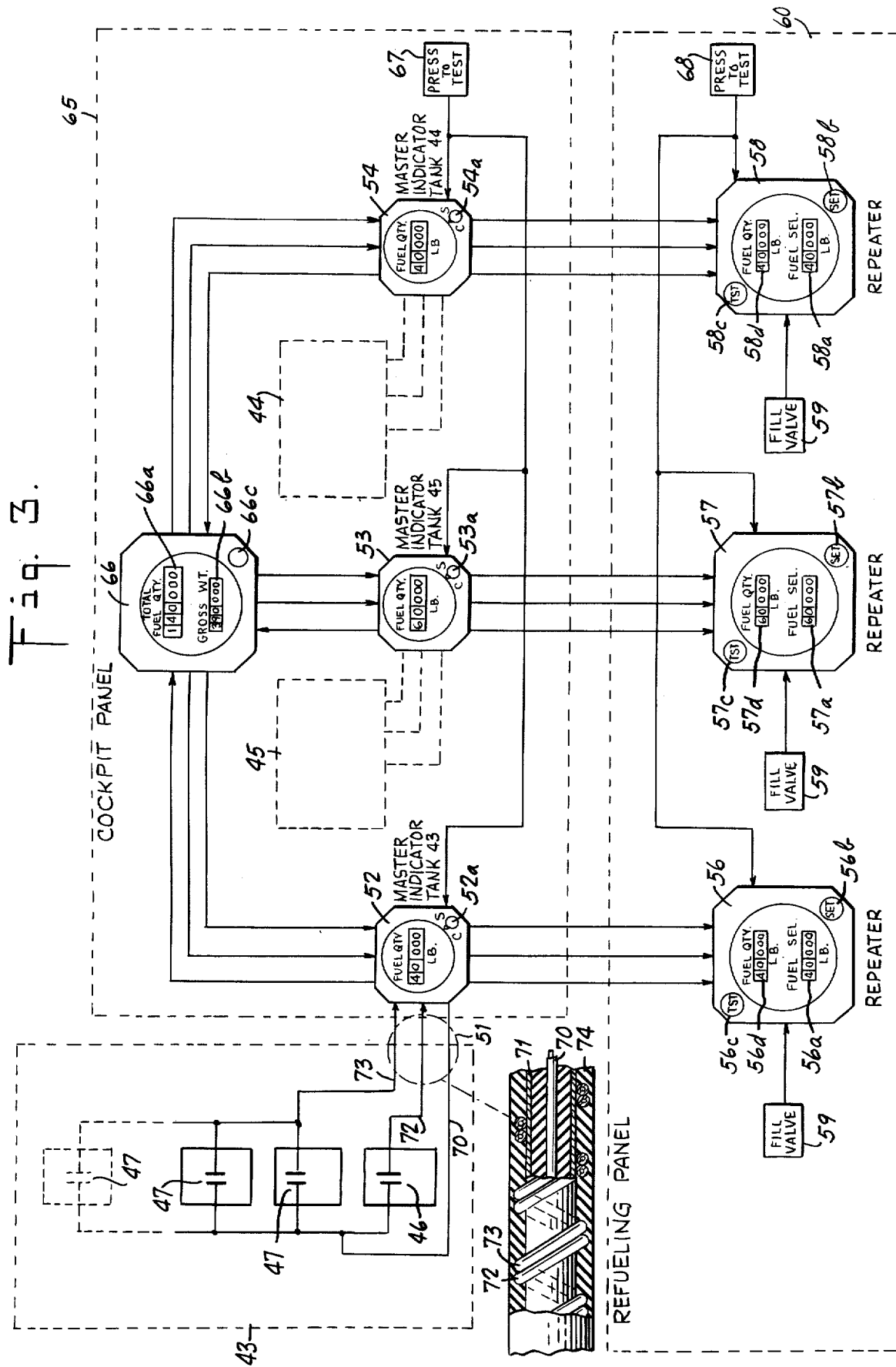
FIG. 3 is a schematic view, similar to FIG. 2, but showing the fuel tanks only diagrammatically and functionally illustrating the transfer of data between the other elements of the system more completely.

FIG. 3 illustrates in greater detail the connections between the master indicators 52, 53 and 54, the totalizer indicator 66 and the repeater indicators 56, 57 and 58. The tank 43 is shown diagrammatically as including three fuel level capacitors 47 and one compensating capacitor 46.

Also shown in FIG. 3 is a section of the cable 51 connecting the master indicator 52 to the capacitors 46 and 47 in the tank 43. As there shown, the cable 51 comprises an inner conductor 70 provided with a coaxial cylindrical shield 71. The return conductors 72 and 73 from the low voltage sides of the capacitors 46 and 47 are shown as being wound helically around the shield 71. The shield 71 is suitably insulated from the conductor 70 and the entire cable is covered with an insulating sheath 74.

Figure 4:
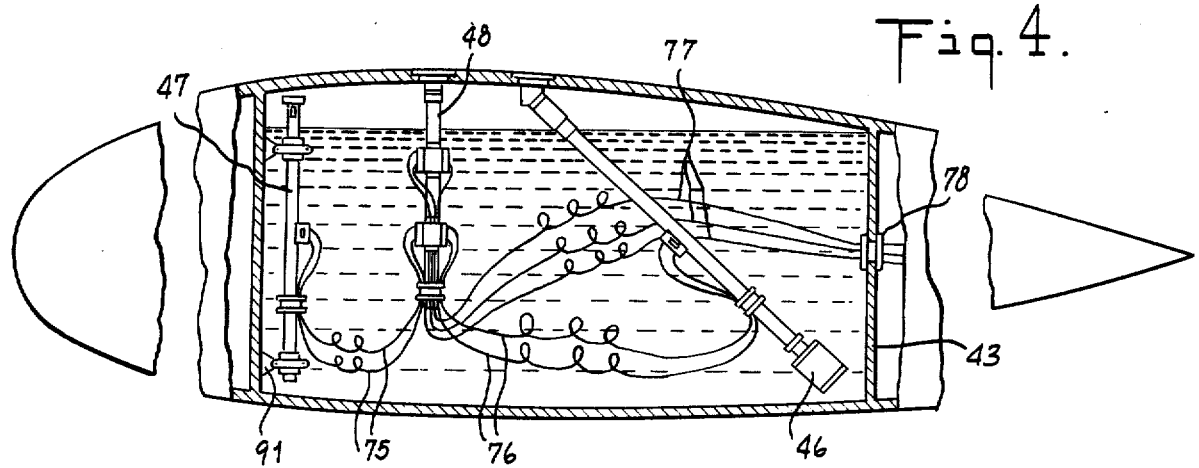
FIG. 4 is a cross-sectional view through the wing tank of an aircraft illustrating a fuel measuring capacitor, a compensating capacitor, and a fault isolation probe, in their normal operating positions.
Figure 5:
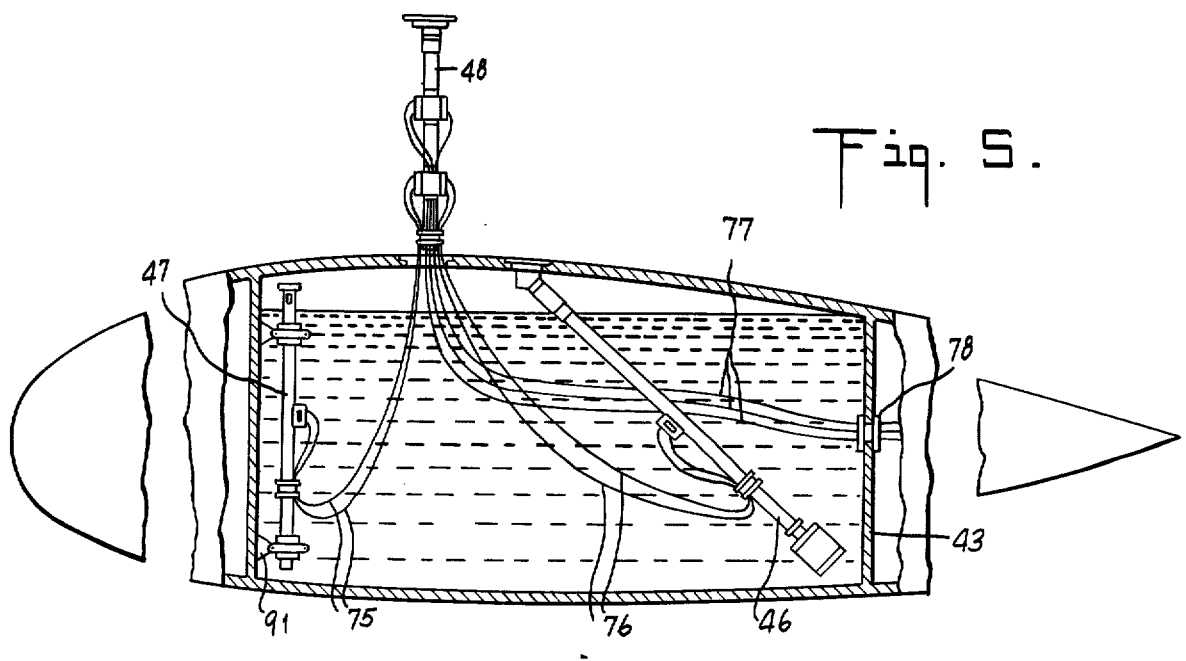
FIG. 5 is a view similar to FIG. 4, but showing the fault isolation probe withdrawn for inspection or test purposes.

FIGS. 4 and 5 show a fore and aft section through the tank 43, illustrating one of the fuel level capacitors 47, the compensating capacitor 46 and the fault isolation probe 48. The level measuring capacitor 47 is connected to the fault isolation probe by slack conductors 75. The compensating capacitor 46 is connected to the fault isolation probe by means of slack conductors 76. Another set of slack conductors 77 connect the fault isolation probe 48 to a rigid connector 78 mounted in a bulkhead wall in the tank 43.

It may be seen by comparing FIGS. 4 and 5 that the fault isolation probe 48 may be lifted out of the tank, without disturbing the capacitors 46 and 47. After it is so lifted, any of the capacitors connected to it may be individually tested by disconnecting the wires connected to that capacitor from the terminals on the probe 48. The conductors 75, 76 and 77 are sufficiently slack so that the probe 48 can be completely removed from the tank without applying strain to any of the wires.

FIGS. 6-8

Fault Isolation Probe

These figures illustrate one of the fault isolation probes 48, shown diagrammatically in FIGS. 1 and 2 and more graphically in FIG. 4 and 5.

The fault isolation probe 48 comprises a support tube 161 flexibly attached at its upper end to a closure plate 162 adapted to engage and cover an opening in an upper wall of an aircraft fuel tank. The tube 161 supports two arrays of low and high voltage terminal blocks, respectively shown at 163 and 164. Each array of terminal blocks is mounted on a plate 165 bent to form an octagonal sleeve encircling the tube 161. The ends of each sleeve 165 are spaced from the tube 161 by a pair of end plates 166 having flanges 166a at their inner peripheries extending along the tube 161 and fastened to the tube by means of rivets 167. The end plates 166 have their outer peripheries bent over toward each other and are fastened by means of rivets 171 to the sleeve 165 and also to insulating terminal boards 172 mounted on the sleeve 165. Each terminal board supports two insulated terminals 173 and is aligned with a strain relief clamp 174 for gripping and holding the wires attached to the terminals, so that no strain can be transmitted through the wires to the terminals. The lower array of terminal blocks 164 has clamps 175 on two of its octagonal faces instead of terminal boards 172. The wires attached to the upper terminals 173 pass through the clamps 174 on the upper terminal boards 172 and thence through clamps 175, thereby preventing accidental contact between the wires 176 and the terminals 173 mounted in the lower array 164 of terminal blocks.

Below the arrays of terminal blocks, the wires 176 and the wires leading to the terminals 173 of the lower array all pass between a clamping ring 177 and the support tube 161. As pointed out in connection with FIGS. 4 and 5, all of the wires extend downwardly from their terminals 173, and the clamping arrangements provided insure that the wires are kept orderly, regardless of the fact that they are in a slack configuration.

The resilient connection between the tube 161 and the plate 162 includes a resilient insulating sleeve 181 attached to the tube 161 by means of rivets 182. The sleeve 181 is enclosed by a resilient ring flange 183, whose upper flanged end is attached to the plate 162 by means of screws 184.

The upper end of the tube 161 has an outwardly projecting flange, on which rests a spacer 185. A wave washer 186 is provided between the spacer 185 and the plate 162. The whole assembly, including the parts 181, 183, 185 and 186 provides a resilient connection between the tube 161 and plate 162, so that shocks cannot be transmitted between the aircarft wing and the tube 161.

While the invention has been described in connection with a specific embodiment thereof, which is intended for inspection of capacitors used for the measurement of the mass of fuel in an aircraft fuel tank, it will be readily understood that the invention is applicable to other inspection problems, where electrical elements to be inspected are not readily accessible.

I claim:

1. Apparatus for measuring a fluid in a tank, comprising:
    a. fluid level sensing capacitor means mounted in the tank, including conductive plate elements extending substantially throughout the vertical dimension of the tank and separated by space open to fluid in the tank so that the dielectric between the plate elements and hence the capacitance of the capacitor means varies with the fluid level and the dielectric constant;
    b. compensating capacitor means mounted in the tank at substantially the lowest level therein, said compensating capacitor means comprising spaced conductive plate elements, the space between said elements being open to the fluid in the tank so that the capacitance of said compensating capacitor means varies only with variations in the dielectric constant of the fluid in the tank;
    c. indicating circuit means outside the tank;
    d. an electrical connector fixed in a wall of said tank;
    e. electrical conductor means extending between said electrical connector and said indicating circuit means; and
    f. fault isolation probe means, including:
        1. an elongated support insertable and removable through an opening in the tank;
        2. closure means for the opening attached to the support;
        3. plurality of terminals mounted on the support; and
    g. slack electrical conductors connecting the terminals on the support to the electrical conductor means on the electrical connector and to the respective plate elements of the liquid level sensing capacitor means and the compensating capacitor means, said conductors being sufficiently slack to permit withdrawal of the probe support and terminals through said opening to permit electrical testing of the capacitor means through said conductors without withdrawing the capacitor means from the tank.

2. Apparatus as in claim 1, in which said indicating circuit means includes potential supply means, a balanceable circuit, and means responsive to a potential in the balanceable circuit for restoring a condition of balance in the circuit.

3. Apparatus as in claim 2, in which:
    1. said potential supply means has a grounded terminal and a high potential terminal; and
    2. said electrical conductor means includes a shielded conductor extending from the high potential terminal of said potential supply means to one plate element of each capacitor means, and unshielded conductors extending from the other plate element of each capacitor means, to the balanceable circuit.

4. Apparatus as in claim 3, in which said unshielded conductors are wound helically around the shield of the shielded conductor.

5. Fluid measuring apparatus as in claim 1, in which said fault isolation probe means further includes:
    a. first and second collars spaced axially of the support, with said first collar closer to the closure means than the second collar;
    b. a plurality of terminals on said first collar; and
    c. a plurality of terminals and strain relief clamps of the second collar, said strain relief clamps holding conductors attached to the terminals on said first collar.

6. Fluid measuring apparatus as in claim 5, including a clamp ring on the support adjacent its innermost end, said clamp ring having its inner periphery apertured to receive all of the conductors attached to both low potential and high potential terminals.

* * * * *